United States Patent
Alagha et al.

(10) Patent No.: US 9,071,600 B2
(45) Date of Patent: Jun. 30, 2015

(54) PHISHING AND ONLINE FRAUD PREVENTION

(71) Applicant: King Saud University, Riyadh (SA)

(72) Inventors: Abdullah Ali Ahmad Alagha, Riyadh (SA); Khaled Alghathbar, Riyadh (SA); Mohammed Nasser Ibrahim Alkhalaf, Industrial Jubail (SA); Abdulaziz Walied Abdulgader Taher, Riyadh (SA)

( * ) Notice: Subject to any disclaimer, the term of this patent is extended or adjusted under 35 U.S.C. 154(b) by 274 days.

(21) Appl. No.: 13/707,496

(22) Filed: Dec. 6, 2012

(65) Prior Publication Data

US 2014/0165177 A1  Jun. 12, 2014

(51) Int. Cl.
  *G06F 21/00* (2013.01)
  *H04L 29/06* (2006.01)

(52) U.S. Cl.
  CPC ........ *H04L 63/0853* (2013.01); *H04L 63/0272* (2013.01); *H04L 63/1483* (2013.01); *H04L 63/168* (2013.01)

(58) Field of Classification Search
  None
  See application file for complete search history.

(56) References Cited

U.S. PATENT DOCUMENTS

| | | | |
|---|---|---|---|
| 8,302,153 B1 * | 10/2012 | Garrity et al. | 726/2 |
| 2004/0058705 A1 * | 3/2004 | Morgan et al. | 455/556.1 |
| 2008/0127319 A1 * | 5/2008 | Galloway et al. | 726/9 |
| 2008/0177994 A1 * | 7/2008 | Mayer | 713/2 |
| 2009/0198618 A1 * | 8/2009 | Chan et al. | 705/66 |
| 2011/0277024 A1 * | 11/2011 | Begley et al. | 726/7 |
| 2014/0008432 A1 * | 1/2014 | de Geer et al. | 235/379 |

* cited by examiner

*Primary Examiner* — Lisa Lewis
*Assistant Examiner* — Maung Lwin
(74) *Attorney, Agent, or Firm* — Hart IP Law and Strategies

(57) ABSTRACT

Phishing and online fraud prevention in one aspect includes a user computer implementing operations such as establishing a VPN tunnel between the user computer and a network operations center, activating a website launcher, reading user credentials from a smartcard, launching a browser in a sandboxed execution environment, and requesting a whitelisted webpage from the network operations center, via the VPN tunnel. The network operations center comprises one or more servers implementing operations such as determining if a user requested webpage is listed for access by the user, and loading and sending the requested webpage to the user, via the VPN tunnel, if the requested webpage is listed for access by the user. The user computer supplies the user credentials to the website and presents a webpage, a homepage, or a one-time password entry page for the website.

32 Claims, 6 Drawing Sheets

PHISHING AND ONLINE FRAUD PREVENTION

BACKGROUND

Phishing is a cybercrime that targets Internet user communities worldwide by deceiving these users into providing online account usernames, passwords and/or other personal information to websites impersonating legitimate websites, by stealing such information via mounted malware or through social engineering means. Generally, phishing harms users by disclosing sensitive information to illegitimate parties, posing a risk of financial loss (e.g. phishing to steal client credit card information and using it to carry illegitimate monetarily transactions), and/or impersonation (e.g. impersonating an Internet user to open a bank account, or the like, for laundering money or for other nefarious activities).

The Anti-Phishing Working Group (APWG) defines Phishing as "a criminal mechanism employing both social engineering and technical subterfuge to steal consumers' personal identity data and financial account credentials". Pharming is a phishing tactic, described by the Chinese University of Hong Kong (CUHK) as an attack that redirects users to a bogus website such as fraudulent websites or proxy servers, typically through DNS server hijacking or poisoning.

Presently, more than a dozen tactics are available in phisher arsenals, some of them are broad tactics and others are tailored to special purposes. These tactics can be broadly classified into three general classes based on the approach followed, including sensitive data collection tactics, social engineering tactics, and attacking tactics.

Sensitive data collection tactics might include: so-called Domain Name System (DNS) poisoning; host file poisoning; content injection, causing page redirects, pop-up windows, etc.; malware, such as keystroke loggers, screen capturers, etc.; rogue software, also known as "rogue-ware," such as "Rogue DHCP" service in a LAN, which may disclose sensitive information; rogue hardware, such as, rogue Wi-Fi access points, enabling phishers to redirect packets and thereby decode content therein; inline packet sniffing, such as tapping into a wire to eavesdrop on transmitted information; and/or direct system hacking.

Social engineering tactics might include: search engine poisoning; spam Uniform Resource Locators (URLs); and/or direct fraud, such as Global System for Mobile Communications (GSM) Subscriber Identity Module (SIM) fraud that targets Short Message Service (SMS) based one time passwords sent to users with the intent of providing stronger authentication.

Attacking tactics might include: so-called Man-in-the-Middle (MitM) passive attacks; MitM active attacks; and/or so-called Man-in-the-Browser (MitB) attacks that may include one or more of the previously mentioned tactics.

Generally, large organizations and governments typically strive to protect their information and operations, and raise client trust, by following strict rules and policies in parallel with adopting latest technological means to protect information from phishing and similar online fraud. Anti-Phishing solutions can be classified based on the front upon which they fight phishing For example, network-based solutions may employ intrusion detection and/or intrusions prevention systems, network access control, and/or the like. Application-based solutions may include phishing filters, anti-virus software, and the like. Infrastructure-based solutions might make use of DNS security extensions, gateway URL filters, and the like. Hardware-based solutions might employ one-time password tokens, integrated circuit chip cards under EURO-PAY®, MASTERCARD® and VISA® (EMV) standards, and/or the like. Regulations and Enterprise Policies may require mutual and/or multifactor authentication as a solution. Cyber intelligence services such as provided under the tradename FRAUDACTION® by RSA® may also be employed as one solution. User-focused solutions might employ phishing and/or online fraud awareness campaigns, or the like.

Since phishing can be carried out by varied tactics on varied fronts, it is difficult to contain. Furthermore, phishing has become highly organized, with rings being formed that span multiple countries, employing thousands of nodes connected to the Internet. These nodes have their roles rotated in implementing the various tactics discussed above to avoid tracking and shutdown operations by authorities. Thus, at present, virtually no solution is capable of effectively preventing phishing and similar online fraud.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The described systems and methods relate to phishing and online fraud prevention wherein a user computing device may implement operations such as establishing a VPN tunnel between the user computing device and a network operations center, activating a website launcher, reading user credentials from a user smartcard, launching a browser in an isolated "sandboxed" execution environment, and requesting a webpage from the network operations center, via the VPN tunnel if the requested webpage is maintained on a local "whitelist." The network operations center may comprises one or more computing devices (i.e. servers) implementing operations such as determining if a user requested webpage is listed for access by the user, consulting a local DNS for authentic website URL address resolution, and loading and sending the requested webpage to the user computing device, via the VPN tunnel. The user computing device supplies the user credentials to the website and presents a webpage, a homepage, or a one-time password entry page for the website.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Figure 1:
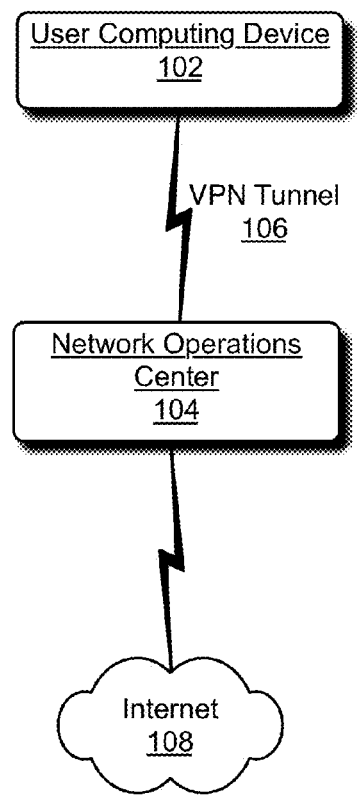
FIG. 1 is a block diagram showing an exemplary system for phishing and online fraud prevention, according to one embodiment.

At present, virtually no solution is capable of effectively preventing phishing and similar online fraud. For example, URL IP filters that are reputative in nature are intended to filter malicious websites. It has been found that while these filters are user centric (i.e. capable of protecting users regardless the websites they access or internet applications they use), they are only partially effective against DNS poisoning, host file poisoning, content injection such as page redirects, search engine poisoning, spam URLs and direct fraud. These URL IP filters that are reputative in nature fail to protect at all against malware such as keystroke loggers, rouge software, rouge hardware, inline packet sniffing, direct system hacking, man-in-the-middle (MitM) passive or active attacks, or man-in-the-browser (MitB) attacks.

Similarly, URL IP filters that employ heuristics, also intended to filter malicious websites, are also user centric. It has been found that these filters also are only partially effective against DNS poisoning, host file poisoning, content injection such as page redirects, search engine poisoning, spam URLs and direct fraud, but are also partially effective against MitM passive or active attacks. URL IP filters that employ heuristics fail to protect at all against malware, rouge software, rouge hardware, inline packet sniffing, direct system hacking, or MitB attacks.

DNS security extensions are intended to prevent DNS cache poisoning. These extensions cannot be considered user centric and it has been found that they fail to protect against any of the above-numerated phishing and/or online fraud tactics other than DNS poisoning.

End point security software is intended to fight malware, hacking and spam. While such software is user centric and effective against direct system hacking, it has been found to be only partially effective against host file poisoning, malware, spam URLs and direct fraud, and MitB attacks. End point security software is ineffective against DNS poisoning, content injection, rouge software, rouge hardware, inline packet sniffing, direct system hacking, search engine poisoning, and MitM passive or active attacks.

Prior virtual keyboards, such as may be implemented to avoid keystroke loggers, while not being user centric, are at least partially effective against malware and inline packet sniffing. However, it has been found that virtual keyboards fail to address DNS poisoning, host file poisoning, content injection, rouge software, rouge hardware, sniffing, direct system hacking, search engine poisoning, spam URLs and direct fraud, MitM passive or active attacks, and MitB attacks.

User centric awareness campaigns are considered effective against spam URLs and direct fraud, and partially effective against content injection, and search engine poisoning However, it has been found that awareness campaigns are not protective from DNS poisoning, host file poisoning, malware, rouge software, rouge hardware, inline packet sniffing, direct system hacking, MitM passive or active attacks, and MitB attacks.

Cyber intelligence services, intended to disarm phishing gangs, are not a user centric solution, and have not been found to be effective against malware, rouge software, rouge hardware, inline packet sniffing, direct system hacking, or MitB attacks. Still, cyber intelligence services are partially effective against DNS poisoning, host file poisoning, content injection, search engine poisoning, spam URLs and direct fraud, and MitM passive and active attacks, but not are entirely effective against any of the herein enumerated phishing and/or online fraud tactics.

Intrusion detection and/or intrusions prevention systems respond to network anomalies, and thus are not user centric. While such systems are effective against rouge software, rouge hardware, and direct system hacking, they have not been found to address DNS poisoning, host file poisoning, content injection, malware, inline packet sniffing, search engine poisoning, spam URLs and direct fraud, MitM passive or active attacks, or MitB attacks at all.

Mutual authentication intended to build trust among client and server devices, but is not a user centric approach and is only partially effective against DNS poisoning, host file poisoning, content injection, malware, search engine poisoning, spam URLs and direct fraud. It has been found that Mutual authentication is not effective at all against rouge software, rouge hardware, inline packet sniffing, direct system hacking, MitM passive or active attacks, or MitB attacks.

Multifactor authentication, intended to provide stricter identity validation, is only partially effective against malware and passive MitM attacks. Further, it has been found that multifactor authentication is not user centric and fails to address DNS poisoning, host file poisoning, content injection, rouge software, rouge hardware, inline packet sniffing, direct system hacking, search engine poisoning, spam URLs and direct fraud, active MitM attacks, or MitB attacks.

Extensively validated Secure Sockets Layer (SSL) certificates are primarily intended to provide protection to a brand's online presence and thus are somewhat user centric. However, it has been found that extensively validated SSL certificates are only partially effective against DNS poisoning, host file poisoning, content injection, search engine poisoning, spam URLs and direct fraud, and MitM passive or active attacks. Extensively validated SSL certificates are ineffective against malware, rouge software, rouge hardware, inline packet sniffing, direct system hacking, or MitB attacks.

Transaction authentication is intended to prevent "on-the-way" data alteration. While transaction authentication is not user centric, it is effective against MitM passive and active attacks, as well as MitB attacks. However, it has been found that transaction authentication is fails to address DNS poisoning, host file poisoning, content injection, malware, rouge software, rouge hardware, inline packet sniffing, direct system hacking, search engine poisoning, or spam URLs and direct fraud.

Public Key Infrastructure (PKI) is intended to provide third-party validated authentication. However, it is not user centric and it has been found to only partially addresses MitM passive and active attacks while failing to address DNS poisoning, host file poisoning, content injection, malware, rouge software, rouge hardware, inline packet sniffing, direct system hacking, search engine poisoning, spam URLs and direct fraud, or MitB attacks.

Thus, no one existing solution is capable of effectively preventing phishing and similar online fraud, much less to do so in a user centric manner. The present systems and methods for the prevention of phishing and/or online fraud are user centric, employing software and hardware that address known vulnerabilities exploited by phishers. The present systems and methods are based on Virtual Private Network (VPN) tunneling, sandboxed application programming, hosted services, smartcard-based authentication, and/or biometric authentication. The present systems and methods for phishing and/or online fraud prevention benefit from the success of these underlying technologies and integrating such technologies in a purpose-oriented manner to stop cybercrime and break "hooks." As a result, the present systems and methods for phishing and/or online fraud prevention successfully addresses the thirteen vulnerabilities discussed above and provide user centric privacy on trusted and scrutinized websites.

As used in the present systems and methods, VPN site-to-site and remote access tunneling makes it virtually impossible for rogue hardware and software to intercept packets and disclose user information. VPN site-to-site and remote access tunneling also plays a major role in preventing MitM attacks originated from LAN users or the like.

Multifactor authentication as used in the present systems and methods is based on what a client knows (e.g. a password or Personal Identification Number (PIN)), what the client posses (e.g. a smartcard), and biometric data gleaned from the user. Thereafter, in accordance with various implementations of the present systems and methods, eager credentials management is employed, such that credentials may be supplied to web login pages by the present systems and methods for phishing and/or online fraud prevention without user intervention. Such credentials are supplied by the present systems and methods, after synchronization to the user's PIN-protected smartcard via a virtual keyboard. Thus, direct system hacking and malware targeting users in an effort to steal the user's online accounts credentials will not find the user's PC vulnerable, since such credentials are stored on the smartcard in an encrypted format. Additionally, since accessing the data stored on the present smartcard requires previous knowledge of the PIN used to encrypt it and/or the required biometric element (i.e. fingerprint, or the like), repercussions from physical theft of a smartcard are minimized. Further, in accordance with various embodiments of the present invention users are provided a smartcard reader with a built-in keypad, thereby providing a means to prevent keystroke loggers from harvesting the smartcard PIN, or similar user input authentication data. Further in this regard, the present systems and methods for phishing and/or online fraud prevention may provide users with a virtual keyboard to enter One-Time Passwords (OTPs) required by banking sites and to enter new credentials to the smartcard, further countering keystroke logging.

An isolated, sandboxed program execution environment ensures isolation from the threats residing on the host machine (i.e. malware or viruses residing on the client's computer). Such an isolated, sandboxed customized browser protects against MitB causing malwares. All important system resources to run the browser are virtualized and access to and from system processes is finely grained. The present systems and methods also make use of hosted web proxy and DNS services such that, proxied browsing via hosted and dedicated proxy servers add an additional layer of security and prevent poisoning, redirection and MitM attacks. As a result, users are "protected from themselves" unwittingly clicking trapping links delivered via a phishing e-mail, written on their FACEBOOOK™ wall, or similarly delivered or presented by a phisher. A URL Whitelist a user builds may build from a list of scrutinized sites further increase protection against trapping links. Such dedicated and highly audited hosted DNS services ensure that each trusted online service website URL is mapped to its real IP address, countering pharming.

The present systems and methods for phishing and/or online fraud prevention provide online service delivery and access that is user centric in that they enable a user to browse safely and carryout financial and sensitive transactions in a private, isolated environment, without concern about surrounding threats residing on the user's machine or exerted from local network or Internet users.

Particular examples discussed herein discuss use of a user's computing device such as a PC, and generally refer to a user as an independent individual, or the like. However, the present systems and methods can be utilized by a number of different types of users, using any number of commuting devices, such as an enterprise employee utilizing a work station, or anyone using a smartphone or other portable device.

The above-discussed and other aspects of the systems and methods for phishing and online fraud prevention are now described in greater detail with reference to FIGS. 1 through 6.

An Exemplary System

FIG. 1 is a block diagram showing exemplary system 100 for phishing and online fraud prevention, according to one embodiment. System 100 includes user computing device 102, which may include one or more processors, operatively coupled to memory comprising computer program instructions executable by the processor(s) to implement various operations for the prevention of phishing and or other types of online fraud. System 100 further includes Network Operations Center (NOC) 104, or the like, comprising one or more computing devices, each comprising one or more respective processors operatively coupled to respective memory, each memory comprising computer program instructions executable by a processor to implement various operations for the prevention of phishing and or other types of online fraud. In accordance with various implementations, user computing device 102 communicates with NOC 104, via VPN tunnel 106, which in turn provides secure connectivity to the Internet (108).

Figure 2:
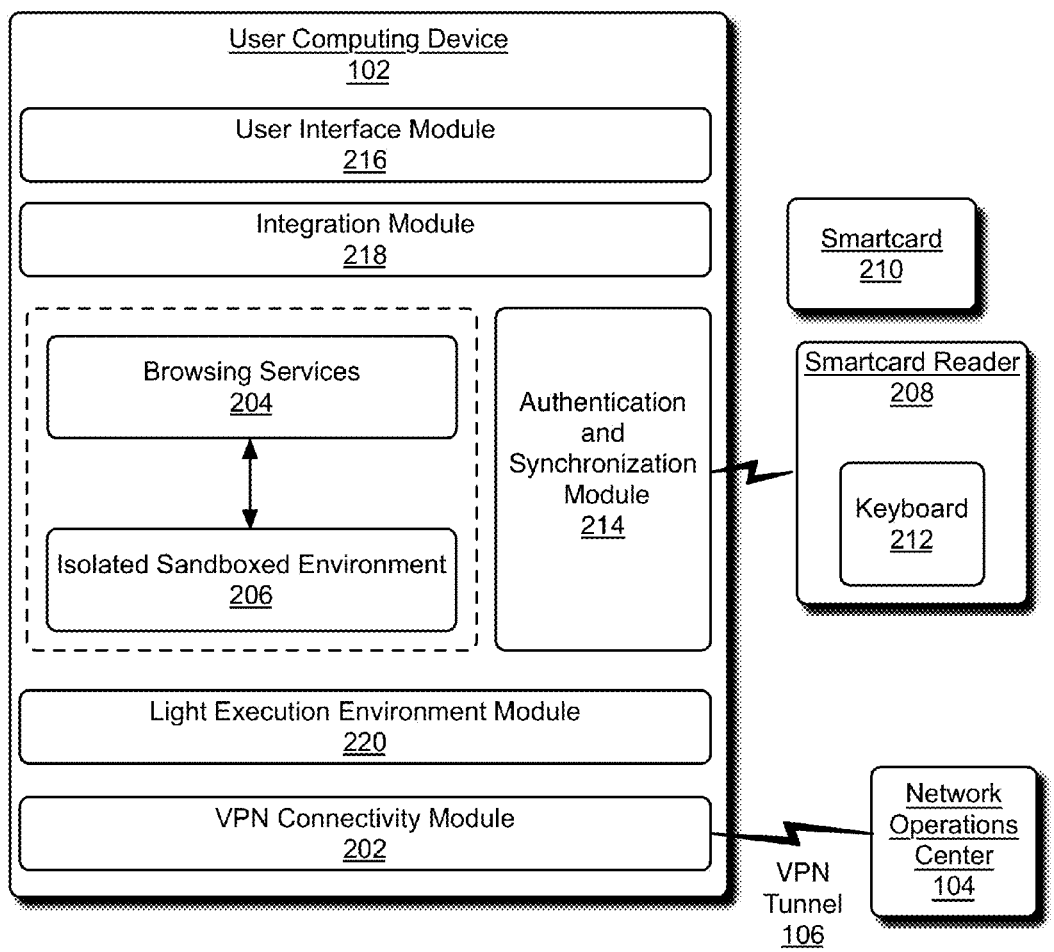
FIG. 2 is a block diagram showing an exemplary user computing device adapted for use in the system for prevention of phishing and online fraud of FIG. 1, according to one embodiment.

FIG. 2 is a block diagram showing exemplary user computing device 102 adapted for use in system 100 for prevention of phishing and online fraud of FIG. 1, according to one embodiment. As noted above, user computing device 102 may implement various operations for the prevention of phishing and/or other types of online fraud. Such operations might be implemented through program modules of the like, and might include establishing VPN tunnel 106 between user computing device 102 and NOC 104, such as through the use of VPN connectivity module 202. VPN tunneling module 202 may also be employed to terminate the VPN tunnel in a secure fashion upon conclusion of a browsing session.

Browsing services 204 executed in isolated, "sandboxed" environment 206 may implement operations such as a website launcher and/or a browser. The browser may carry out tasks such as requesting a webpage from NOC 104, via VPN tunnel 106, supplying user credentials, provided by authentication and synchronization module 214, as discussed in greater detail below, to websites, and presenting a webpage, a homepage, or a one-time password entry page for the website to the user. Such a customized browser, running over an isolated, sandboxed execution environment provides protection from host operating system malware infections (i.e. malware running on user computing device 102). This customized browser further facilitates whitelist-based browsing to filter out requests to websites not listed for the user, as per her profile that she defined at the time she subscribed to the service, before requesting it from the NOC 104, as discussed in greater detail below.

Connected smartcard reader 208 may read user credentials from user smartcard 210 and/or accept entry of a PIN on the reader's keyboard/keypad 212. The security of such a PIN-enabled smartcard can be enhanced by use of separate keypad 212, and further still through the use of biometric security features, such as a fingerprint reader, which may be incorporated into smartcard reader 208. The reader may interface with the present phishing and online fraud prevention systems and methods through authentication and synchronization module 214, and/or the like. Authentication and synchronization module 214 may further enable secure subscription data management, such as updating the website whitelist, ticket opening, credential updating and synchronizing to- and-from the smartcard 210, such as via the virtual keyboard. This module may further supply user credentials to the browsing services module 204, which may be originally provided by smartcard reader 208 from smartcard 210, and/or the like. Smartcard 210 may store, among other data, user accounts' credentials in an encrypted format and be only accessible if a correct PIN is supplied by the user via the keyboard 212 on smartcard reader 208, and/or the like. Smartcard 210 may become inaccessible if the PIN entered incorrectly for more than three times, and/or the like. Keyboard 212 on Smartcard Reader 208 serves, among other purposes, to protect the user PIN from being harvested by malware or keystroke loggers that may exist on her machine 102, and/or the like. Smartcard reader 208 may incorporate a keyboard 212 and/or other biometric features reader and, among other operations, read the data stored on the smartcard 210 and supply it to authentication and authorization module 214 if the user had entered a correct PIN, and/or the like.

Other modules employed by user computing device 102 may include user interface module 216, which may, among other operations, provide a virtual keyboard for the user to input user account credentials to the smartcard and/or to enter a PIN. User interface module 216 may also facilitate user interaction with the functions of the present phishing and online fraud prevention "client-side software" running on user computing device 102 by providing multiple windows, buttons, fields and error or informational messages, and/or the like. Incorporation for use on the user's computing device is provided through integration module 218. This module may, among other operations, provide communication interfaces between each module and the other, and/or the like. Light execution environment module 220 may enable application operations without requiring administrator level access, and/or the like. For example, light execution environment module 220 may offer a users the ability to install software embodying the present system without requiring administrator or root-level privileges.

Figure 3:
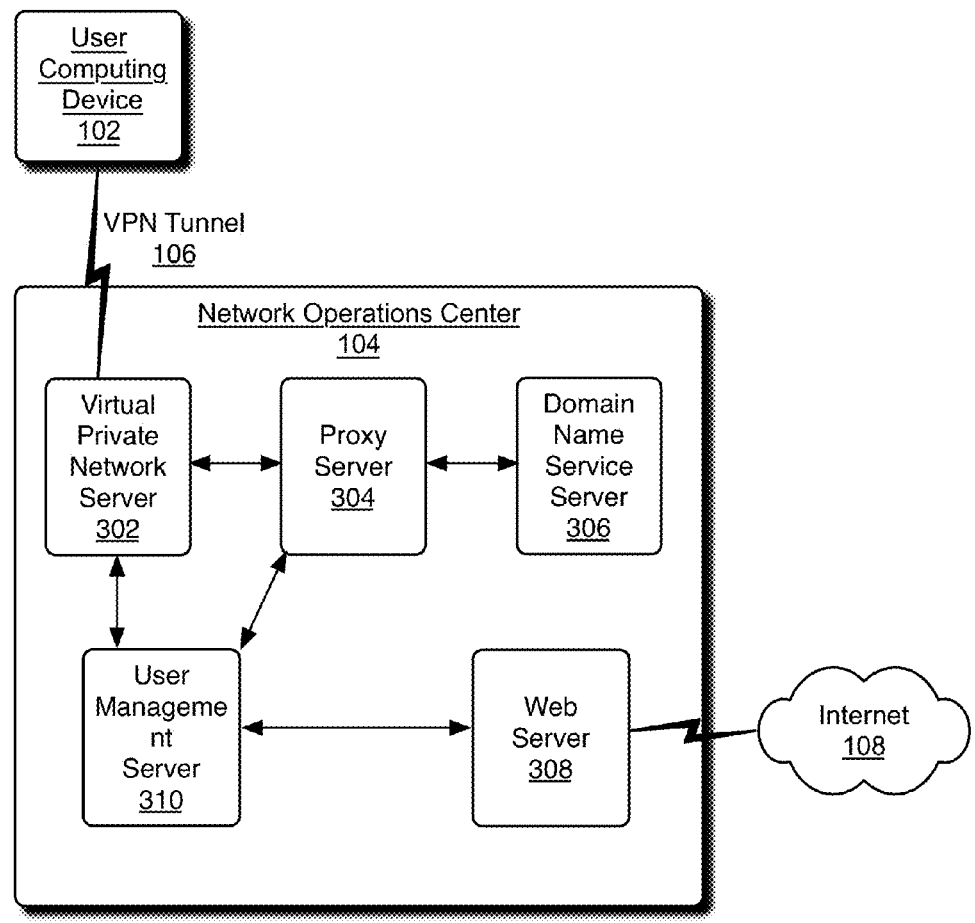
FIG. 3 is a block diagram showing an exemplary network operations center of the system for prevention of phishing and online fraud of FIG. 1, according to one embodiment.

FIG. 3 is a block diagram showing an exemplary Network Operations Center (NOC) 104 of system 100 of FIG. 1 for prevention of phishing and online fraud, according to one embodiment. As noted above, NOC 104 comprises reliable computing facilities including one or more computing devices, e.g. servers, implementing server-side software executing various operations for the prevention of phishing and or other types of online fraud. In short, NOC 104 houses one or more servers meant to facilitate and manage secure user access and subscription services, and to ensure a high level of protection for NOC operations. For example, in accordance with various implementations, concentrated VPN server 302 may, among other operations, facilitate establishing and maintaining VPN tunnel 106 initiated by user computing device 102 for data communications between user computing device 102 and NOC 104.

Proxy server 304 may be employed in the present systems and methods to, among other operations, finely tune traffic and ensure compliance, such as by implementation of operations of the present methods for online fraud and/or phishing prevention, including determining if a user requested webpage is listed for access by the user. If the requested webpage is listed for access by the user, proxy server 304 may consult a local DNS server 306, which maintains names of safety inspected and otherwise "whitelisted" sites for particular users. Whereupon, proxy server 304 may load the requested webpage and send it to user computing device 102, via VPN tunnel 106. In accordance with various implementations, users have the ability to add websites to their list of websites if the website is already whitelisted in accordance with the present systems and methods, otherwise a user may request an unavailable website be scrutinized and added to the whitelist, at least for that user.

Also, NOC 104 may include user management server 310, which may, among other operations, house user information, manage user access, host a billing system, and/or the like. Web server 308 may also, among other operations, facilitate new and/or existing user account management. NOC 104 employs reliable Internet connectivity 108 to, among other operations, offer worldwide VPN-based user access and backside site-to-site access to online services sites if applicable. This internet connectivity 108 is also used by NOC 104 to access online services sites requested by the user via user computing device 102 that are on the user whitelist, and/or the like. Regardless, NOC 104 may be firewalled, and/or may employ other intrusion prevention systems, to, among other purposes, facilitate provision of phishing and/or online fraud prevention services in accordance with the present systems and methods.

An Exemplary Procedure

Figure 4:
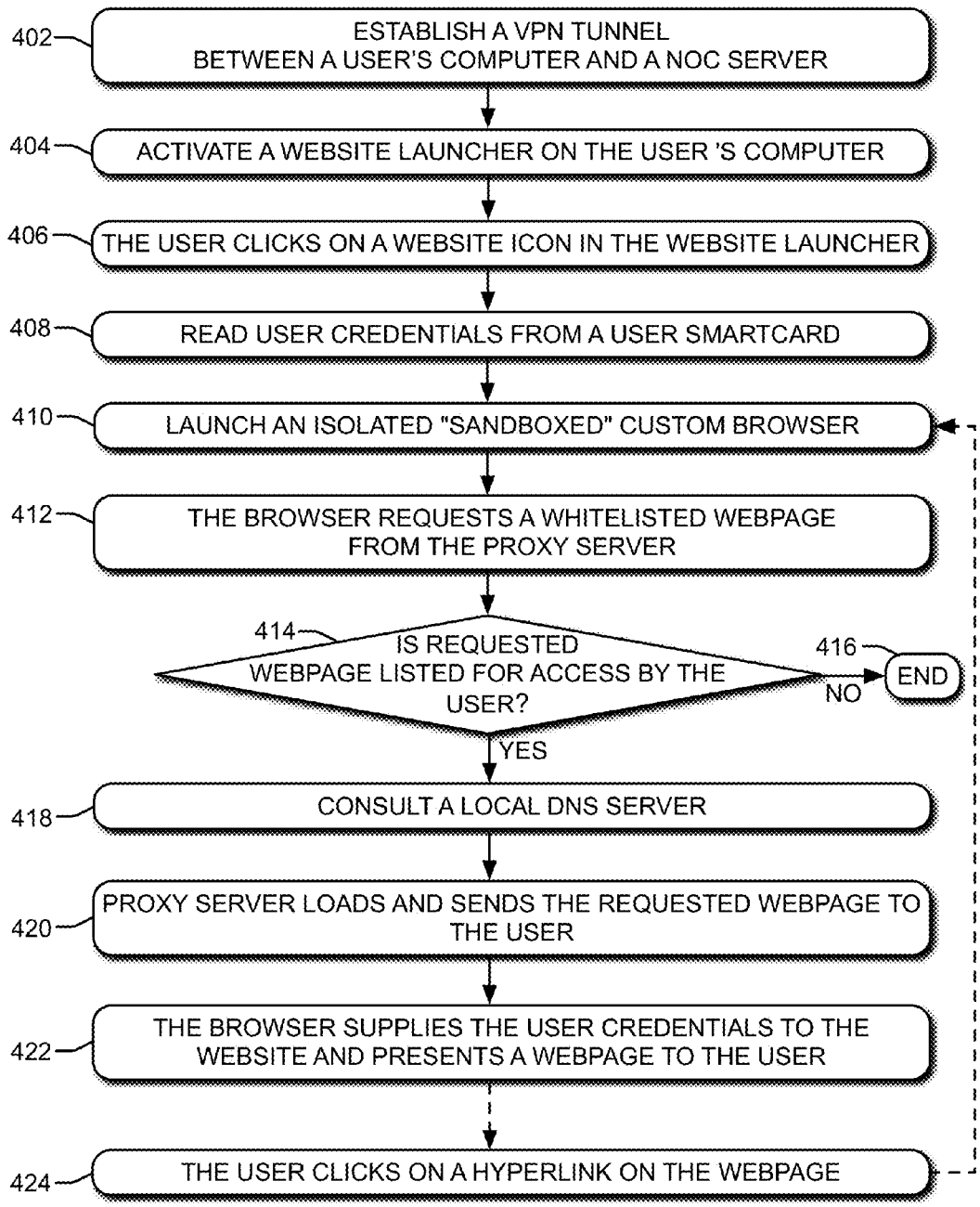
FIG. 4 is a flowchart showing an exemplary procedure for phishing and online fraud prevention, according to one embodiment.

FIG. 4 is a flowchart showing exemplary procedure 400 for phishing and online fraud prevention, according to one embodiment. Method 400 for phishing and online fraud prevention establishes a VPN tunnel between a user's computer and a VPN server in a Network Operations Center (NOC) at 402, such as though an application carrying out method 400. In particular, a client application running on the user's computing device may, as discussed in greater detail below with respect to FIG. 5 and process 500, ask the user to connect a keypad-installed smartcard reader, such as via a USB port, insert her smartcard and enter the card's PIN code via the reader's keypad. The application may then read the user identifying information from the card via an encrypted channel and try to initiate the VPN tunnel based on the user's subscription information.

At 404 a website launcher is activated on the user's computer by the application. Thus, in accordance with various implementations, once the tunnel is initiated at 402, the application will show the user a set of websites to which the user has subscribed, each of which may be represented as a graphical button. Once the user clicks on one of theses icons, the application will launch a specially customized, isolated, sandboxed browser pointing to the desired website login page, and fill the login interface fields with users credentials read from the smartcard, all of this is done programmatically without user involvement. Thus, when at 406, the user clicks on a website icon in the website launcher, the application decrypts and reads the user's credentials from the user smartcard at 408. At 410 the application launches a custom browser, which runs in an isolated, sandboxed execution environment on the user computing device. At 412 a determination is made as to whether the requested website is whitelisted and if so the browser requests a webpage of the website from the proxy server in the NOC, via the VPN tunnel.

Once the NOC's proxy server receives a request from the user application to access a certain website, the proxy server consults a local DNS server for a resolution and responds with a verified and trusted site page. More particularly, in accordance with certain implementations, a determination is made at 414, such as by the proxy server by referencing a user profile that is stored and managed by a user management server in the NOC, whether the requested webpage is listed for access by the user. If not, process 400 ends at 416. However, if the requested webpage is listed for access by the user, the proxy server consults with a DNS server in the NOC at 418 and the proxy server loads and sends the requested webpage to the user, via the VPN tunnel at 420. The proxy server may load this page directly by accessing the website or by accessing the website via a dedicated site-to-site VPN tunnel between a NOC VPN server and an online service provider web server. In this way, VPN tunneling is employed end-to-end, between user computing device 102 and NOC 104, and between NOC 104 and a website. The browser supplies the user's credentials to the website and presents a homepage of the website, a one-time password entry page for the website, or other appropriate webpage to the user at 422.

Thereafter, the user may click on a hyperlink on the homepage or webpage at 424. Whereupon, process 400 returns to 410 and the application again launches the custom browser, running in the isolated, sandboxed execution environment on the user computing device. At 412 the browser requests the hyperlink webpage from the proxy server in the NOC, via the VPN tunnel. At 414 a determination is made by the proxy server whether the requested hyperlink webpage is listed for access by the user. If the requested hyperlinked webpage is listed for access by the user, the proxy server consults with the NOC DNS server at 418 and the proxy server loads and sends the requested webpage to the user, via the VPN tunnel at 420. If necessary, the browser supplies the user's credentials to the website at 422 and presents the hyperlinked webpage to the user.

Thus, local whitelist-based filtering is provided in accordance with the present systems and methods, using a browser-installed script before requesting a webpage from proxy server 304 in NOC 102. In other words, URLs are double-checked to see if they're listed for access by the user, a first time using a script such as in accordance with steps 408 and 410 above, where the browser facilitates whitelist-based browsing to filter out requests to websites not listed for the user, and a second time by proxy server 304 at step 414.

Figure 5:
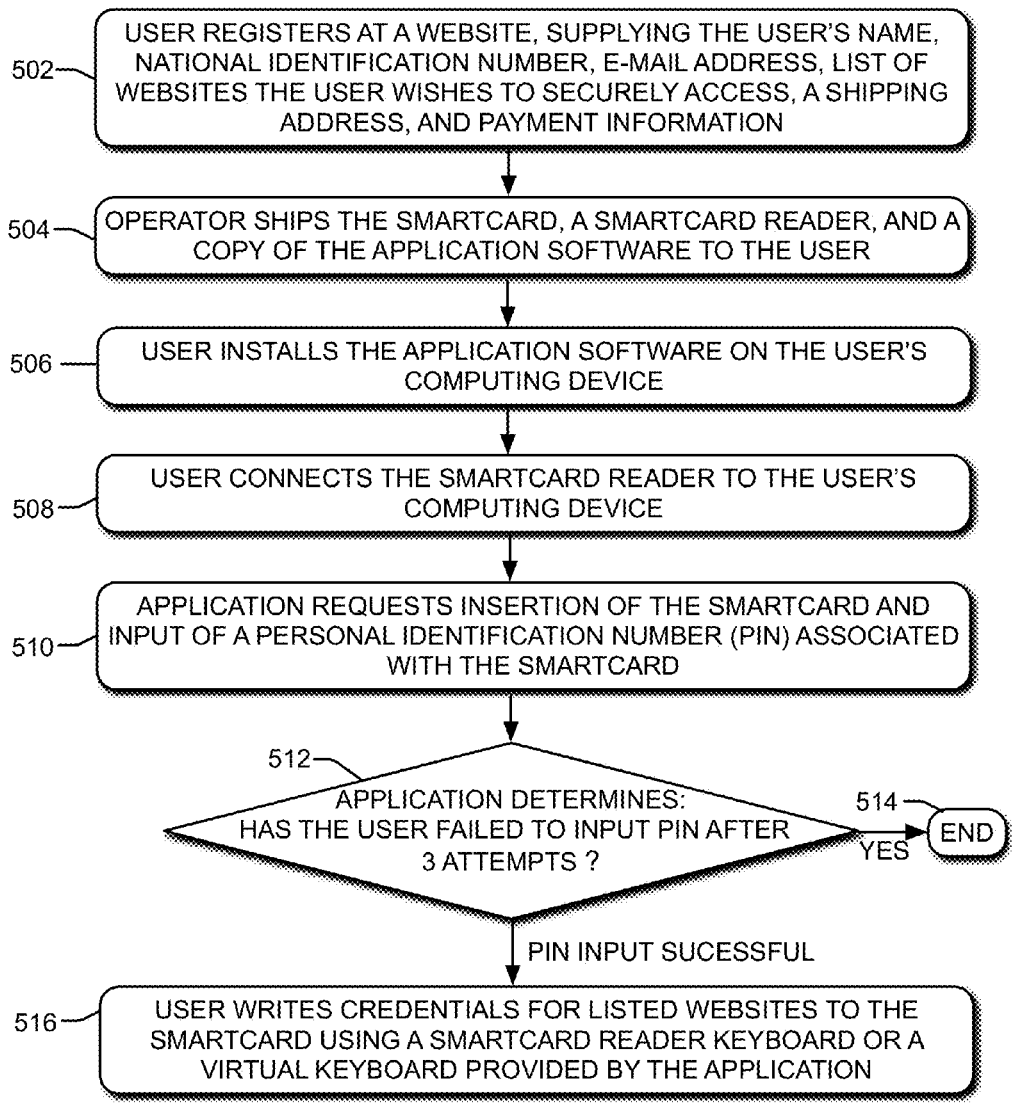
FIG. 5 is a flowchart showing an exemplary procedure for user registration and first time use of the present systems and methods for phishing and online fraud prevention, according to one embodiment.

FIG. 5 is a flowchart showing exemplary procedure 500 for user registration and first-time use of the present systems and methods for phishing and online fraud prevention, according to one embodiment. Process 500, might include the user registering at a website at 502. This registration website may be made publicly available using the web server located in NOC 104. At 502, the user might supply his or her name, national identification number (such as a Social Security Number), an e-mail address, a list of websites the user wishes to securely access, a shipping address, and/or payment information, and/or the like. Whereupon, an operator of process 400 may, at 504, ship the afore-discussed smartcard (which may be locked with the national identification number provided by the user in 502 and/or a default Personal Identification number (PIN)), a smartcard reader, and a copy of application software discussed above with respect to process 400, to the user. Upon receipt of the smartcard, reader and application software shipped at 504, the user may install the application software on the user's computing device (i.e. the user's PC, or the like) at 506 and connect the smartcard reader to his/her computing device at 508 such as when prompted by the application. Upon installation, the application may request insertion of the smartcard into the reader and input of a PIN associated with the smartcard by the user at 510. As one security measure from key logging, or the like, the user may be prompted to enter the PIN at 510 using the keyboard integrated with the smartcard reader and/or to otherwise enter user account credentials to the smartcard using a virtual keyboard provided by the application. For further security, if the user fails to provide the proper PIN after a predetermined number of attempts, such as three attempts, as shown at 512, the application may "lock-out" the smartcard in accordance with the present systems and methods for phishing and online fraud prevention (i.e. end process 500 at 514). In accordance with various embodiments, if the smartcard is thus locked, the user may unlock it using a secondary PIN that may be provided by the operator upon a request. If the PIN entered at 510 is accepted at 512, the user is prompted to write her credentials associated with the websites chosen at 502 to the smartcard at 516. These credentials may be written to the smartcard via an encrypted communication channel between the user computing device and the smartcard reader. Once the PIN entered at 510 is accepted and the user had written her credentials associated with the websites chosen on 502, process 400 may be initiated, such as by opening the VPN tunnel at 402 and activating the website launcher at 404. In accordance with various embodiments, the user may also change her primary PIN. The new primary PIN is tested by the application installed on the user's computer to ensure it is complex enough before replacing the old primary PIN.

An Exemplary Computing Device

Figure 6:
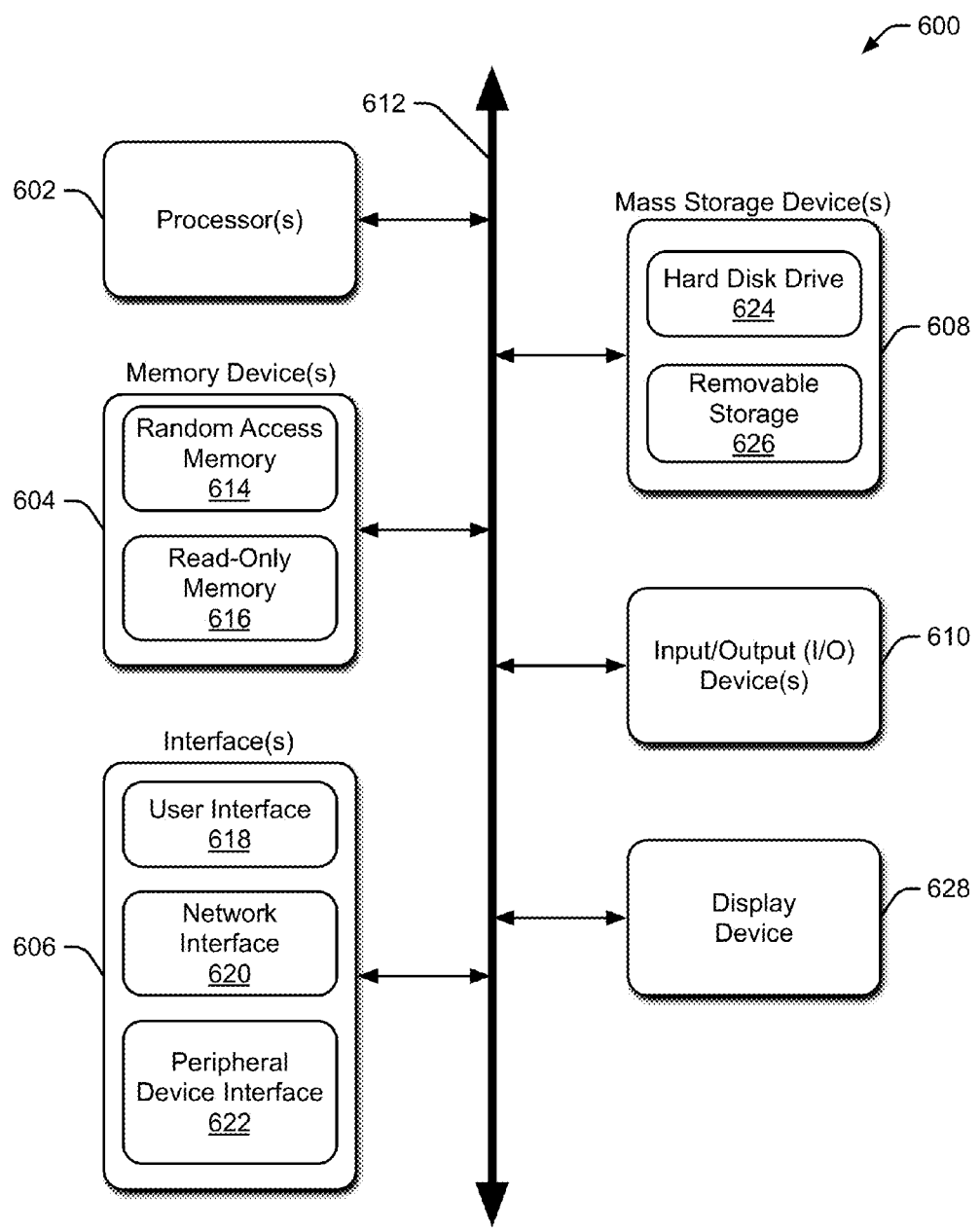
FIG. 6 is a block diagram illustrating an exemplary computing device on which phishing and online fraud prevention operations may be implemented, according to one embodiment.

FIG. 6 is a block diagram illustrating exemplary computing device 600 on which phishing and online fraud prevention operations may be implemented, according to one embodiment. Computing device 600 represents an exemplary implementation of user computing device 102 of FIGS. 1 and 2 and/or any of server computing devices 302-312, and may be used to perform various procedures described herein, for example, processes 400 and 500 described above for the prevention of phishing and/or online fraud. Computing device 600 can function as a personal computer, a server, a client, a worker node, or any other computing entity. Computing device 600 can be any of a wide variety of computing devices, such as a desktop computer, a notebook computer, a server computer, a handheld computer, a wireless communications device, and/or the like. Computing device 600 includes one or more processor(s) 602, one or more memory device(s) 604, one or more interface(s) 606, one or more mass storage device(s) 608, and one or more Input/Output (I/O) device(s) 610, all of which are coupled to a bus 612. In one implementation, computing device 600 is operatively coupled to a display device 628. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM)) 614 and/or nonvolatile memory (e.g., read-only memory (ROM) 616) and system memory comprising computer-program modules and program data. Computer-program modules include computer program instructions executable by the processor to perform the operations described herein. Memory device(s) 604 may also include rewritable ROM, such as Flash memory. Mass storage device (s) 608 include various computer readable media, such as magnetic tapes, magnetic disks, optical disks, solid state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, voice-recognition, monitors or other display devices, speakers, printers, network interface cards, modems, lenses, CCDs or other image capture devices, a smartcard reader (which may include its own keypad and/or biometric reader), and/or the like. Display device 628 includes any type of device capable of displaying information to one or more users of computing device 600. Examples of display device 628 include a monitor, display terminal, video projection device, and/or the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interfaces include user interface 618 and peripheral device interface 622. Bus 612 allows processor(s) 602, memory device(s) 604, interface(s) 606, mass storage device(s) 608, and I/O device (s) 610 to communicate with one another, as well as other devices or components coupled to bus 612. Bus 612 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Alternate Embodiments

Although the systems and methodologies for phishing and online fraud prevention have been described in language specific to structural features and/or methodological operations or actions, it is understood that the implementations defined in the appended claims are not necessarily limited to the specific features or actions described. For example, although the described systems and methods generally refer to a user computing device being a PC or the like the present systems an methods may be employed with any number of client devices such as a workstation, mobile phone, potable Wi-Fi-enabled device, or the like. Further, operations and or equipment described as part of the NOC may be decentralized as long as secure data communications, such as data communications via VPN tunnels, is maintained between the NOC elements. In contrast, various server functions described as residing in the NOC may be further centralized into fewer, just one server, or even into the user's computing device itself. Accordingly, the specific features and operations of the described systems and methods to prevent phishing and online fraud are disclosed as exemplary forms of implementing the claimed subject matter.

The invention claimed is:

1. A computer-implemented method for phishing and online fraud prevention comprising:
   installing, by a user, software embodying the computer-implemented method for phishing and online fraud prevention, wherein the user is not required administration or root-level privileges to install the software embodying the computer-implemented method for phishing and online fraud prevention;
   establishing a virtual private network tunnel between a user's computing device and a server;
   activating a website launcher on the user's computing device;
   decrypting and reading user credentials from a user smartcard, in response to the user clicking on a website icon in the website launcher;
   launching a browser in an isolated, sandboxed execution environment on the user's computing device;
   checking a local whitelist on the user's computer against the requested website, and if the website is listed for access by the user, the browser requesting a webpage of the website from the server;
   determining at the server if a requested webpage is listed for access by the user;
   the server loading and sending the requested webpage to the user's computing device, via the virtual private network tunnel, if the requested webpage is listed for access by the user in the server; and
   the browser supplying the user credentials to the webpage's website and presenting the webpage, a homepage of the website, or a one-time password entry page of the website to the user.

2. The method of claim 1, wherein the loading comprises loading the requested webpage via another virtual private network tunnel between the server and a server hosting the requested webpage.

3. The method of claim 1, further comprising:
   the user clicking on a hyperlink on the homepage or webpage;
   launching a browser in another isolated, sandboxed execution environment on the user's computing device;
   checking the local whitelist on the user's computer against the hyperlink webpage, and if the webpage's website is listed for access by the user the browser, requesting the hyperlink webpage from the server;
   the server determining if the hyperlink webpage is listed for access by the user;
   the server loading and sending the hyperlink webpage to the user's computing device, via a virtual private network tunnel, if the hyperlink webpage is listed for access by the user in the server; and
   the browser supplying the user credentials, decrypted and read from the smartcard, to a website associated with the hyperlink and presenting the hyperlink webpage.

4. The method of claim 3, wherein the server loading the hyperlink webpage comprises loading the hyperlink webpage via another virtual private network tunnel between the server and a server hosting the hyperlink webpage.

5. The method of claim 1, further comprising the user registering at a publicly available website.

6. The method of claim 5, wherein the registering comprises the user supplying one or more of the user's name, the user's national identification number, a unique and confidential number, an e-mail address, a list of websites the user wishes to securely access, a shipping address, and payment information.

7. The method of claim 6, wherein the national identification number is a Social Security Number.

8. The method of claim 7, further comprising an operator of the method shipping one or more of the smartcard locked with the national identification number or a default Personal Identification Number (PIN), a smartcard reader, and a copy of software embodying the method to the user.

9. The method of claim 8, further comprising the user connecting the smartcard reader to the user's computing device.

10. The method of claim 9, further comprising requesting insertion of the smartcard in the smartcard reader and input of a PIN associated with the smartcard.

11. The method of claim 10, wherein incorrect entry of the PIN a predetermined number of times locks out the smartcard.

12. The method of claim 11, further comprising the user unlocking the smartcard using a secondary PIN provided by the operator of the method upon request by the user.

13. The method of claim 10, further comprising:
the user changing the PIN; and
testing a resulting new PIN to ensure the new PIN has at least a minimum complexity.

14. The method of claim 1, further comprising the user modifying the local whitelist and writing website user account credentials to the smartcard using a virtual keyboard, prior to the reading of the user credentials from the user smartcard and the browser supplying the user credentials to the webpage's website.

15. The method of claim 14, wherein said writing is carried out using an encrypted communications channel between the user's computing device and a smart card reader.

16. A non-transitory tangible computer program medium comprising computer program instructions executable by one or more computing devices comprising one or more processors, the computer program instructions, when implemented by the one or more processors, performing operations comprising:
installing, by a user, software embodying the non-transitory tangible computer program medium for phishing and online fraud prevention, wherein the user is not required administration or root-level privileges to install the software embodying the non-transitory tangible computer program medium;
establishing a virtual private network tunnel between a user's computing device and server;
activating a website launcher on the user's computing device;
decrypting and reading user credentials from a user smartcard;
launching a browser in an isolated, sandboxed execution environment on the user's computing device;
checking a local whitelist on the user's computing device against the requested website, and if the website is listed for access by the user, requesting a webpage from the server;
determining at the server if the requested webpage is listed for access by the user;
loading and sending the requested webpage to the user, via the virtual private network tunnel, if the requested webpage is listed for access by the user in the server;
supplying the user credentials to the website; and
presenting a webpage, a homepage, or a one-time password entry page for the website to the user.

17. The non-transitory tangible computer program medium of claim 16 wherein the loading operations comprise loading the requested webpage via another virtual private network tunnel between the server and a server hosting the requested webpage.

18. The non-transitory tangible computer program medium of claim 16 wherein the operations further comprise:
launching another browser in another isolated, sandboxed execution environment on the user's computing device in response to the user clicking on a hyperlink on the homepage or webpage;
checking the local whitelist on the user's computing device against the hyperlink webpage, and if the hyperlink webpage's website is listed for access by the user the browser, requesting the hyperlink webpage from the server;
determining at the server if the hyperlink webpage is listed for access by the user;
loading and sending the hyperlink webpage to the user, via the virtual private network tunnel, if the hyperlink webpage is listed for access by the user in the server;
supplying the user credentials to the website associated with the hyperlink; and
presenting the hyperlink webpage.

19. The non-transitory tangible computer program medium of claim 18, wherein the server loading the hyperlink webpage comprises loading the hyperlink webpage via another virtual private network tunnel between the server and a server hosting the hyperlink webpage.

20. The non-transitory tangible computer program medium of claim 16 wherein the operations further comprise requesting insertion of the smartcard in a smartcard reader, requesting input of a Personal Identification number (PIN) associated with the smartcard, and locking out the smartcard upon incorrect entry of the PIN a predetermined number of times.

21. The non-transitory tangible computer program medium of claim 20, wherein the operations further comprise the user unlocking the smartcard using a secondary PIN provided by an operator of the method upon request by the user.

22. The non-transitory tangible computer program medium of claim 20, wherein the operations further comprise:
the user changing the PIN; and
testing a resulting new PIN to ensure the new PIN has at least a minimum complexity.

23. The non-transitory tangible computer program medium of claim 16 wherein the operations further comprise presenting a virtual keyboard to the for entering user account credentials to the smartcard, prior to the decrypting and reading of the user credentials from the user smartcard and supplying the user credentials to the website.

24. The non-transitory tangible computer program medium of claim 23, wherein the writing is carried out using a encrypted communications channel between the user's computing device and a smart card reader.

25. A system for phishing and online fraud prevention comprising:
a user computing device comprising one or more processors operatively coupled to memory comprising computer program executable by the one or more processors to implement operations comprising:
installing, by a user, software embodying the system for phishing and online fraud prevention, wherein the user is not required administration or root-level privileges to install the software;
establishing a virtual private network tunnel between the user computing device and a network operations center;

activating a website launcher;
decrypting and reading user credentials from a user smartcard;
launching a browser in an isolated, sandboxed execution environment;
requesting a webpage from the network operations center, via the virtual private network tunnel, if the requested website is listed on a local whitelist on the user computing device;
supplying the user credentials to the website; and
presenting a webpage, a homepage, or a one-time password entry page for the website; and
a network operations center comprising one or more computing devices, each comprising one or more respective processors operatively coupled to respective memory, each memory comprising computer program executable by a processor to implement operations comprising:
determining if a user requested webpage is listed for access by the user;
consulting a local domain name system server if the requested webpage is listed for access by the user; and
loading and sending the requested webpage to the user computing device, via the virtual private network tunnel
wherein, the installation of the computer programs for the user computing device and the network operations center of the system does not require administration or root-level privileges.

26. The system of claim 25 wherein the loading comprises loading the requested webpage via another virtual private network tunnel between the server and a server hosting the requested webpage.

27. The system of claim 25, wherein:
the operations implemented by the user computing device further comprise:
launching another browser, in another isolated, sandboxed execution environment, in response to the user clicking on a hyperlink on the homepage or webpage; and
requesting a webpage associated with the hyperlink from the network operations center via the virtual private network if the requested website is listed on a local whitelist on the user computing device; and
the operations implemented by the one or more computing devices comprising the network operations center further comprise:
determining if a requested webpage associated with the hyperlink is listed in the network operations center for access by the user;
consulting a local domain name system server if the requested webpage associated with the hyperlink is listed for access by the user; and
loading and sending the requested webpage associated with the hyperlink to the user, via the virtual private network.

28. The system of claim 27, wherein loading the requested webpage associated with the hyperlink comprises loading the requested webpage associated with the hyperlink via another virtual private network tunnel between the server and a server hosting the requested webpage associated with the hyperlink.

29. The system of claim 25, wherein the one or more computing devices comprising the network operations center include one or more of a virtual private network server, a proxy server, a domain name system server, a user management server, and a web server.

30. The system of claim 25, further comprising a smartcard reader connected to the user computing device.

31. The system of claim 25 wherein the operations implemented by the user computing device further comprise providing a virtual keyboard for the user to input user account credentials to the smartcard.

32. The system of claim 31, further comprising an encrypted communications channel between the user's computing device and a smart card reader.

* * * * *